United States Patent
Ueda

[19]

[11] Patent Number: 5,918,961
[45] Date of Patent: Jul. 6, 1999

[54] PROJECTION TYPE DISPLAY DEVICE

[75] Inventor: Motoi Ueda, Kanagawa-ken, Japan

[73] Assignee: Nikon Corporation, Tokyo, Japan

[21] Appl. No.: 08/852,815

[22] Filed: May 7, 1997

[30]     Foreign Application Priority Data

May 10, 1996  [JP]  Japan .................................. 8-116744
Dec. 6, 1996  [JP]  Japan .................................. 8-326644

[51] Int. Cl.$^6$ ................................................. G03B 21/28
[52] U.S. Cl. .......................... 353/20; 353/122; 353/34; 349/8
[58] Field of Search ................................ 353/20, 31, 34, 353/37, 122; 349/5, 7, 8, 9

[56]              References Cited

U.S. PATENT DOCUMENTS

| | | | |
|---|---|---|---|
| 4,425,028 | 1/1984 | Gagnon et al. | 353/31 |
| 4,461,542 | 7/1984 | Gagnon | 353/31 |
| 4,464,019 | 8/1984 | Gagnon | 353/31 |
| 4,544,237 | 10/1985 | Gagnon | 353/31 |
| 4,715,684 | 12/1987 | Gagnon | 353/33 |
| 5,327,270 | 7/1994 | Miyatake | 349/9 |
| 5,575,548 | 11/1996 | Lee | 353/34 |
| 5,653,520 | 8/1997 | Kato | 353/20 |

FOREIGN PATENT DOCUMENTS

61-84606   4/1986   Japan .
62-12634   1/1987   Japan .

*Primary Examiner*—William Dowling
*Attorney, Agent, or Firm*—Chapman and Cutler

[57]              ABSTRACT

A color projection display device separates light into the colors of red, green and blue. Each of the color components is modulated, superimposed with the other components again and projected. The device provides color picture images with few irregularities in illumination intensity. Polarizing beam splitters used for modulation of the colors are constructed from base materials having a minimum absolute photoelasticity constant value at different wavelengths. Thus, the absolute photoelasticity constant value of the base material for a particular wavelength of light that is separated by the polarizing beam splitter can be made small and double refractions, resulting from stress, are unlikely to occur in any of the components. As a result, a disturbance in the polarization and separation performance is unlikely to occur, and irregularities in the illumination intensity can be reduced.

20 Claims, 4 Drawing Sheets

Figure 4

PROJECTION TYPE DISPLAY DEVICE

BACKGROUND OF THE INVENTION

1. Field of the Invention

The present invention concerns a projection type display device that separates light from a light source into the colors red (R), green (G), and blue (B). The device then performs spatial modulation, superimposes the color components again, and projects the resulting light over an element such as a screen.

2. Description of Related Art

Various projection type display systems have been developed in recent years. These systems display color pictures by separating light from a light source into the colors R, G, and B, providing the separated light components with picture image information by performing phase modulation, and then superimposing the components again and projecting them onto an element such as a screen. Highly accurate control over the polarization characteristic of light is demanded in these systems. Furthermore, a polarizing beam splitter; which functions as a polarizer as well as an analyzer, controls the polarization characteristic and its role in the picture quality of projected picture images is tremendous.

Systems using translucent materials that are homogeneous and isotropic with respect to lights and systems in which a translucent material is soaked in a liquid (a liquid soaking type system) and used as the base material have been considered for such a polarizing beam splitter in a projection type display.

Generally, the optical anisotropy that is created within the translucent material induces double refractions due to various causes in a polarizing beam splitter that uses homogeneous and isotropic translucent material. There is an obstruction of the polarization characteristic of the light being disturbed. That obstruction becomes the cause of a reduction in the quenching ratio of the polarization S and the polarization and separation P and causes irregularities in the illumination intensity. The main causes of the optical anisotropy within the translucent material include external stresses generated during processing stages of the glass (cutting, joining with other materials, and formation of a film at the surface, for example) and operations incorporating glass into the optical system (holding with a jig and bonding, for example) thermal stress generated by heating within the glass (adsorption of light energy, for example) or external heating (heating of a peripheral device, for example), and also stress generated when materials that have a different thermal expansion ratio than glass are brought into contact and bonded during heating, for example.

To solve the problem provided by these stresses, many liquid soaking type polarizing beam splitters have been proposed in a structure in which a plate made of a translucent material, which is provided with a coating for a polarizing beam splitter, is soaked in a liquid that is provided with an index adjustment. Such is indicated in U.S. Pat. No. 4,687,301. The index of refraction of the aforementioned liquid is adjusted to be identical to the index of refraction of the aforementioned translucent material. Also, it is not always necessary that the translucent material in plate form be homogeneous and isotropic with respect to light. The reason for soaking the translucent material in a liquid in this manner is to prevent stress from being generated and also to allow coating materials, which could not be used due to a different index of refraction between the interface of the coating and the air, to function as a polarizing beam splitter.

Liquid soaking type polarizing beam splitters, however, also have many problems. Some of these problems are mentioned below.

First, there is a large change in the index of refraction in the liquid resulting from the temperature. Second, there is nonuniformity in the index of refraction resulting from a change in the index of refraction. Third, there is a convection current due to the fact that a liquid is utilized. Fourth, there is a volume change that is also due to the fact that a liquid is utilized. Fifth, impurities, dirt, and bubbles in the liquid produce influences. Sixth, the liquid may leak.

Liquid soaking type polarizing beam splitters basically have provided excellent performance. However, this type of beam splitter also has many problems at the same time. The manufacture of a projection type display device using liquid soaking type polarizing beam splitters, moreover, is extremely time consuming and is linked to an increase in cost. Furthermore, changes in characteristics due to the temperature is a problem that cannot for the most part be avoided.

SUMMARY OF THE INVENTION

In solving the problems in liquid soaking type polarizing beam splitters mentioned above, it is considered significant that the photoelasticity constant becomes practically zero when a translucent material is used in the polarization optical system. It was disclosed in Japanese Kokai Patent Application No. 6-13570 that optical anisotropy is not generated in glass under thermal stress and dynamic external stress and that the polarization characteristic of light is not disturbed when a glass with a photoelasticity constant of practically zero is used as the base material for the polarizing beam splitter.

Although the glass with a photoelasticity constant of practically zero mentioned above may be used as the base material for the polarizing beam splitter, the polarization is disturbed, the quenching ratio of the polarization S and the polarization and separation P is reduced, and irregularities in illumination intensity and color occur in a color projection type display device that separates and modulates three colors (RGB).

One object of the present invention is to offer a color projection type display device that separates three colors (RGB), modulates them, respectively, and then superimposes them again and projects them. The device can display color picture images with few irregularities in illumination intensity.

To attain the aforementioned object, the present invention provides a projection type display device equipped with a light source unit which emits primary, secondary, and tertiary beams having different wavelengths into different respective directions. Primary, secondary, and tertiary spatial light modulating elements respectively modulate the intensities of the aforementioned primary, secondary, and tertiary beams in order to provide each of the aforementioned primary, secondary, and tertiary beams with picture image information. Primary, secondary, and tertiary polarization and separation units are, respectively, arranged between the light source unit and the primary, secondary, and tertiary spatial light modulating elements in order to separate the optical path of the beam reflected by the spatial light modulating elements from the optical path of the incident beam. A projection optical system superimposes the reflected beams, which were separated by the aforementioned primary, secondary, and tertiary separation units, and projects these beams.

The primary, secondary, and tertiary polarization separation units are respectively equipped with an optical component, through which at least one of either the incident beam or the beam reflected to the primary, secondary, and tertiary spatial light modulating elements passes.

The base material which makes up the optical component of the primary polarization and separation unit, the base material which makes up the optical component of the secondary polarization and separation unit, and the base material which makes up the optical component of the tertiary polarization and separation unit provide different wavelengths from each other. The absolute value of the photoelasticity constant becomes minimal.

Photoelasticity constants of various glasses at various wavelengths were measured. It was discovered that the photoelasticity constant of glass has a large dispersion as a function of the wavelength of visible light that is used in a projection type display. This dispersion results in irregularities in the illumination intensity of the projection type display. More precisely, a glass in which the composition is adjusted so that the absolute value of the photoelasticity constant for light of one wavelength becomes minimal is used as the base material for the optical component of the polarization separation unit. Notwithstanding this, the absolute value of the photoelasticity constant of this base material becomes large for light of other wavelengths, and the optical separation characteristic of other polarization separation units decreases. Therefore, each absolute value of the photoelasticity constants for light of three wavelengths is made small by using materials having wavelengths that are different from each other, and in which the absolute value for the photoelasticity constant is minimal, as the base materials for the optical components for the three polarization separation units in the present invention. As a result, irregularities in illumination intensity are reduced.

DESCRIPTION OF THE PREFERRED EMBODIMENT

The structure of the projection type display device implemented in this invention will be explained by reference to FIG. 4.

Figure 4:
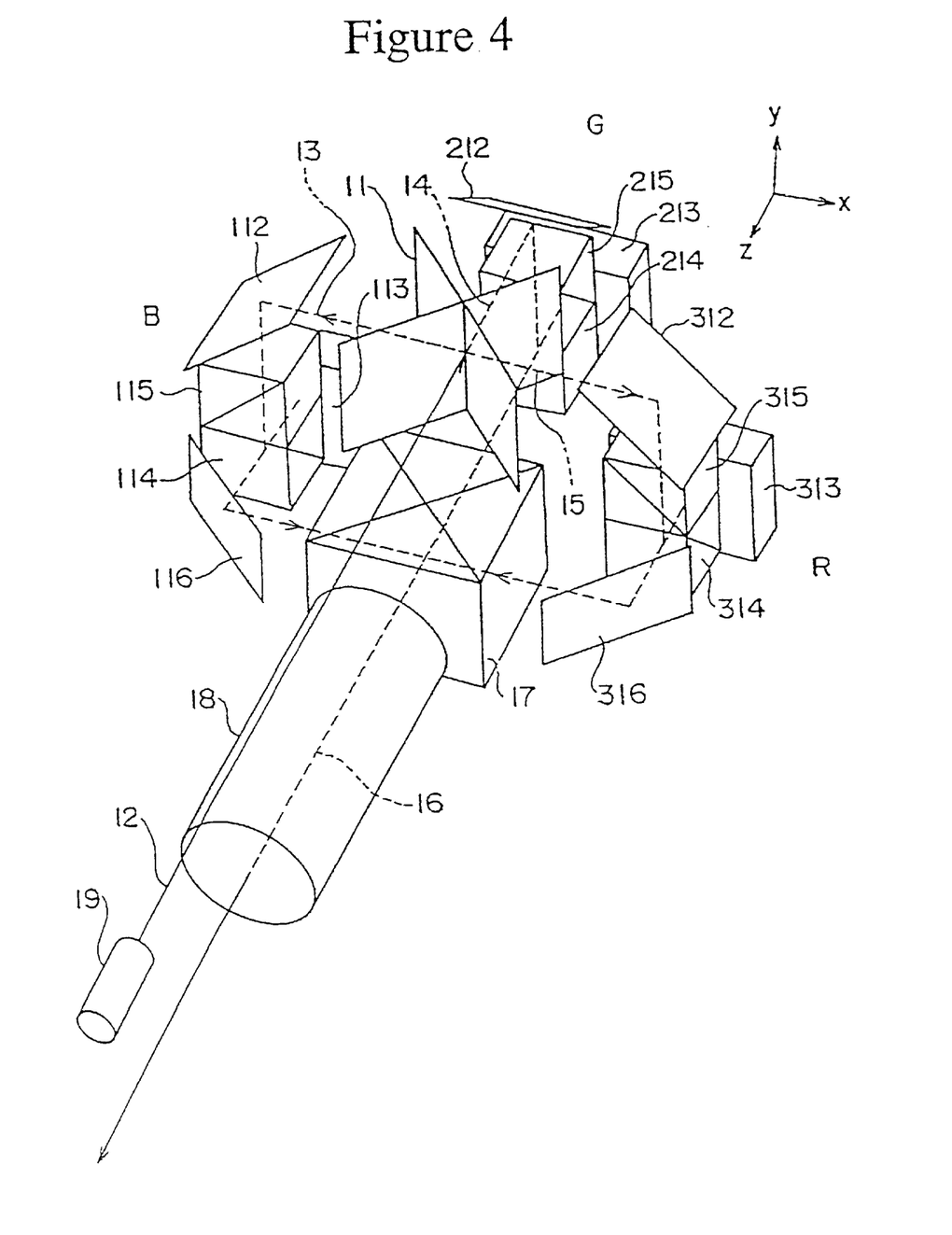
FIG. 4 is a block diagram illustrating the arrangement of one form of the optical system according to the present invention.

FIG. 4 shows the projection type display device as equipped with a light source (19) and a cross dichroic mirror (11) along an optical axis (12). The cross dichroic mirror (11) separates the beam from the light source (19) into three beams according to the wavelength of the light, and respectively emits three beams which are separated along three optical axes (13), (14), and (15) in different directions.

A mirror (112), an auxiliary polarizing beam splitter (115), a main polarizing beam splitter (114), a spatial modulating element (113), and a mirror (116) are arranged in this order along the optical axis (13). A mirror (212) an auxiliary polarizing beam splitter (215), a main polarizing beam splitter (214), and a spatial modulating element (213) are arranged in this order along the optical axis (14). A mirror (312), an auxiliary polarizing beam splitter (315), a main polarizing beam splitter (314), a spatial modulating element (313), and a mirror (316) are arranged in this order along the optical axis (15).

A cross dichroic prism (17) is arranged at a position where the beam that is polarized by the mirror (116), the beam that has passed through the main polarizing beam splitter (214), and the beam that was polarized by the mirror (316) enter. The cross dichroic prism (17) superimposes these beams and emits them in the direction of the optical axis (16). A projection lens (18) is arranged along the optical axis (16).

The present embodiment is equipped with a white light source, such as a xenon lamp or a metal halide lamp, for example, as the light source (19). A filter (not illustrated) eliminates light with wavelengths of less than 400 nm and light with wavelengths of more than 680 nm from the white light that is emitted by this light source.

The cross dichroic mirror (11) is constructed in order to polarize light B (blue) with wavelengths of more than 400 nm but less than 510 nm in the direction of the optical axis (13), to allow light G (green) with wavelengths of more than 510 nm but less than 590 nm to pass in the direction of the optical axis (14), and to polarize light with wavelengths of more than 590 nm but less than 680 nm the direction of the optical axis (15).

Each of the spatial modulating elements (113), (213), and (313) is equipped with a reflection type liquid crystal panel with its main plane in the direction of the yz plane in FIG. 4. These reflection type liquid crystal panels have a structure that allows the light with its polarization along the y axis to enter into the liquid crystal, changes the polarization along the x axis, modulates the optical intensity within the yz plane between and dark and light, provides the light with picture image information that can be displayed by darkness or lightness, and projects the light. The spatial modulating elements (113), (213), and (313) are connected to a picture image controller, which is not shown in the figure. The picture image controller controls picture image information that is given to the light by driving the liquid crystal. The picture image controller separates the signals that indicate picture image information that should be projected into picture image information signals for B, picture image information signals for G, and picture image information signals for R. Then, the liquid crystal panel of the spatial modulating element (113) is driven by the picture image information signals for B, the liquid crystal panel of the spatial modulating element (213) is driven by the picture image information signals for G, and the liquid crystal panel of the spatial modulating element (313) is driven by the picture image information signals for R.

Figure 3:
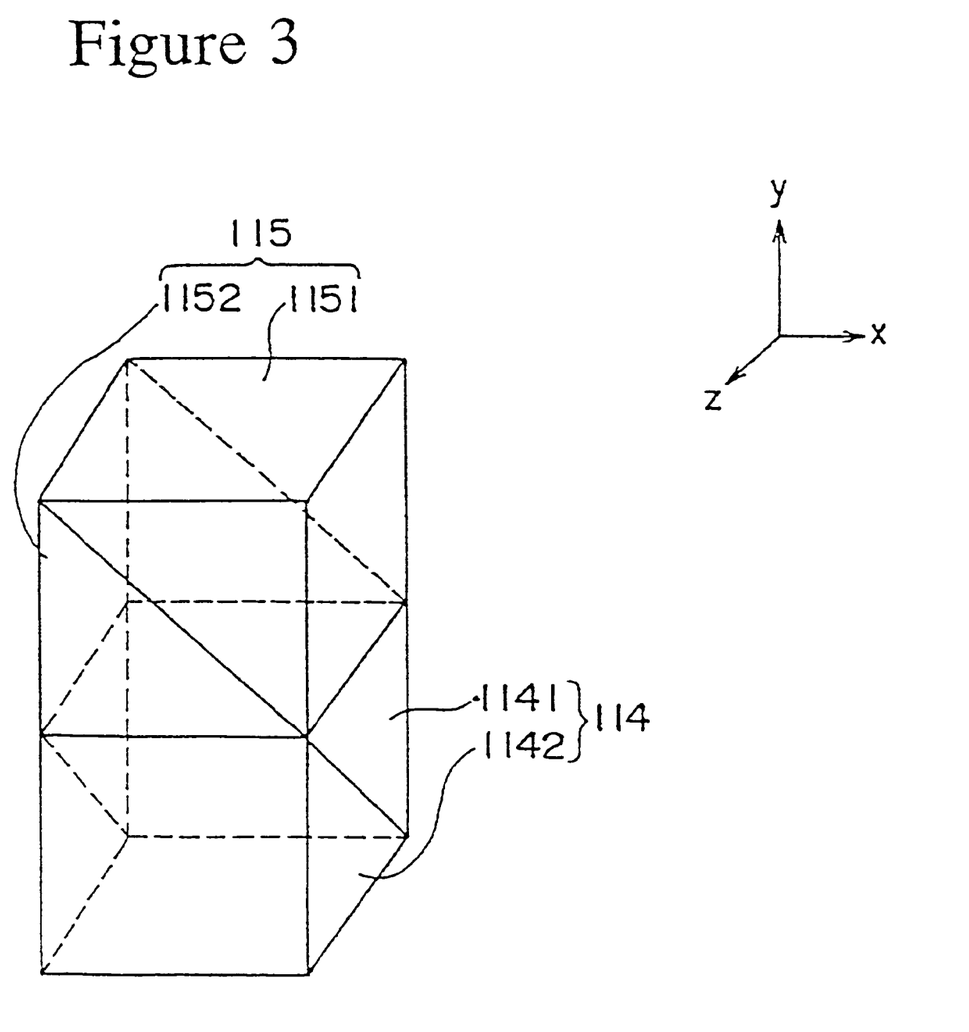
FIG. 3 is a perspective view illustrating the structure of the polarizing beam splitters of the present invention.

The auxiliary polarizing beam splitter (115) as well as the main polarizing beam splitter (114) have the structure illustrated in FIG. 3. The auxiliary polarizing beam splitter (115) shown in FIG. 3 has two prisms (1152) and (1151) forming a reflection surface oriented at 45° with respect to the optical axis. The prisms are laminated together at the reflection surface. The main polarizing beam splitter (114) has a structure in which two prisms (1142) and (1141) have a reflection surface oriented at 45° relative to the optical axis. The prisms are also laminated together at the reflection surface. The reflection surface of the auxiliary polarizing beam splitter (115) is parallel to the surface of the main polarizing beam splitter (114) that is the reflection surface rotated by 90° about the optical axis. Both the auxiliary polarizing beam splitter (115) and the main polarizing beam splitter (114) are equipped with an antireflection coating and a polarization and separation coating, which increases the polarization and separation performance between the reflection surfaces that are laminated together. As an antireflection coating, it is possible to use a multilayer film in which $SiO_x$ films and $Al_2O_3$ films are alternately laminated so that the optical film thickness is ¼ of the light wavelength.

The auxiliary polarizing beam splitter (215) and the main polarizing beam splitter (214), as well as the auxiliary polarizing beam splitter (315) and the main polarizing beam splitter (314), also have the same structure as the auxiliary polarizing beam splitter (115) and the main polarizing beam splitter (114).

In the projection type display device shown in FIG. 4, light with a wavelength of more than 400 mm but less than 680 nm is emitted from the light source (19). The light is separated by the cross dichroic mirror (11), which polarizes and directs light B with a wavelength of more than 400 nm but less than 510 nm toward the optical axis (13), light G with a wavelength of more than 510 nm but less than 590 nm toward the optical axis (14), and light R with a wavelength of more than 590 nm but less than 680 nm toward the optical axis (15).

Light B is polarized by the mirror (112) and enters the auxiliary polarizing beam splitter (115). Then, only the light of the incident beam with polarization parallel to the x axis at the 45° reflection surface of the auxiliary polarizing beam splitter (115) passes through the reflection surface and enters the main auxiliary polarizing beam splitter (114). Light in other polarization directions is reflected. The 45° reflection surface of the main auxiliary beam splitter (114) is parallel to the x axis and, therefore, polarizations parallel to the x axis are reflected at the reflection surface and enter the spatial modulating element (113). The spatial modulating element (113) provides light B, which has entered and has a polarization parallel to the x axis, with picture image information for light B by dark or light modulation in the xy plane, rotates the polarization direction so that is parallel to the y axis and reflects it. Light B, which is reflected and has a polarization parallel to the y axis this time passes through the reflection surface of the main auxiliary beam splitter (114), is polarized by the reflection mirror (116), and enters the dichroic prism (17).

In the same way, light G, which has passed through the cross dichroic mirror (11), is polarized by the reflection mirror (212) and enters the auxiliary polarizing beam splitter (215). Then, only the light from light G that has a polarization direction parallel to the x axis passes through the auxiliary polarizing beam splitter (215) and enters the main polarizing beam splitter (214). It is then reflected by the main auxiliary polarizing beam splitter (214) and enters the spatial modulating element (213). The spatial modulating element (213) provides light G, which has entered and has a polarization parallel to the x axis, with picture image information for light G by dark or light modulation in the xy plane, rotates the polarization so that is parallel to the y axis, and reflects it. Light G, with a reflected polarization parallel to the y axis, this time passes through the main auxiliary beam splitter (214) and enters the dichroic prism (17).

Light R, which is polarized in the direction of the optical axis (15) by the cross dichroic mirror (11), is polarized by the reflection mirror (312) and enters the auxiliary polarizing beam splitter (315). Then, only the light from light R, which has a polarization parallel to the x axis, passes through the auxiliary polarizing beam splitter (315) enters the main polarizing beam splitter (314), is reflected by the main polarizing beam splitter (314), and enters the spatial modulating element (313). The spatial modulating element (313) provides light R, which has entered and has a polarization parallel to the x axis, with picture image information for light R by dark or light modulation in the xy plane, rotates the polarization so that it is parallel to the y axis, and reflects it. Light R, which has a reflected polarization parallel to the y axis, this time passes through the main auxiliary beam splitter (314), is further polarized by the reflection mirror (316), and enters the dichroic prism (17).

The dichroic prism (17) combines the BGR beams that have entered and emits them in the direction of the optical axis (16). The projection lens (18) converts the combined BGR beams into an enlarged beam of lights and emits it towards a screen which is not illustrated. Thus, a color picture image in which the BGR picture images overlap each other is displayed on the screen.

To attain a high performing device with a uniform illumination intensity for picture images without the generation of color irregularities, for example, in such a projection display device, it is necessary to maintain a highly accurate polarization state when light in each of the BGR colors respectively passes through the auxiliary polarizing beam splitters (115), (215), and (315) as well as the main polarizing beam splitters (114), (214), and (314).

It was recognized that the photoelasticity constant in all wavelength ranges of visible light cannot be reduced. This is the case even though the photoelasticity constant at a specific wavelength is small when the same glass is used for all of the auxiliary polarizing beam splitters (115), (215), and (315), as well as the main polarizing beams splitters (114), (214), and (314). More precisely, it is impossible to maintain an optimal polarization accuracy in all wavelength ranges when the auxiliary polarizing beam splitters (115), (215), and (315), as well as the main polarizing beams splitters (114), (214), and (314), are made from one type of glassy. Accordingly, in the present invention, the glass that comprises the bass materials for the auxiliary polarizing beam splitters (115), (215), and (315), as well as the main polarizing beams splitters (114), (214), and (314), was selected in the manner described below.

Generally, when a force is applied to a homogeneous and isotropic translucent material like glass, for example, and stress is generated, an optical anisotropy is generated in this translucent material. The material then begins to have a double refraction as is true of crystals of some kinds. This is called the "photoelasticity effect". The index of refraction in the translucent material when stress is generated can be indicated by the so-called index ellipsoid. The principal index of refraction axis of the index ellipsoid matches the principal axis of stress. Generally, when the principal indices of refraction are $n_1$, $n_2$, and $n_3$ and the main stresses are $\sigma_1$, $\sigma_2$, and $\sigma_3$ (those with a common character attached respectively are in the same direction), the following relationship is established.

Equation 1 (1)

$$n_1 = n_0 + C_1\sigma_1 + C_2(\sigma_2 + \sigma_3)$$
$$n_2 = n_0 + C_1\sigma_2 + C_2(\sigma_3 + \sigma_1)$$
$$n_3 = n_0 + C_1\sigma_3 + C_2(\sigma_1 + \sigma_2)$$

In equation (1), $C_1$ and $C_2$ are the constants that are characteristic of the wavelength of light and the type of the translucent material, and $n_0$ is the index of refraction when the stress is zero.

When light is allowed to enter such a translucent material, the incident light is separated into two linear polarizations along the respective directions $\sigma_1$ and $\sigma_2$. The oscillation surfaces become orthogonal to each other when the coordinates used are such that the direction of the incident light is in the same direction as $\sigma_3$. Index of refraction differences ($n_1$, $n_2$) in the direction of each principal main stress are generated when light exits the translucent material, and an optical path difference (phase difference) $\Delta\phi$, which can be expressed by the following equation, is generated between these two linear polarizations.

Equation 2 (2)

$$\Delta\phi = (2\pi/\lambda)(n_1 - n_2) \times l$$
$$= (2\pi/\lambda)(C_1 - C_2)(\sigma_2 - \sigma_1) \times l$$
$$= (2\pi/\lambda) \times C \times (\sigma_2 - \sigma_1) \times l$$

In equation, $\lambda$ is the optical wavelength, and l is the light transmitting thickness of the translucent material. $C = C_1 - C_2$ is the photoelasticity constant.

Glass samples were prepared with a light transmitting thickness of l=10 mm. The double refraction in a condition in which an established stress is applied in the direction of $\sigma_2 = \sigma_3 = 0$ was measured by using single-color beams with various wavelengths, and the photoelasticity constant was calculated from Equation 1 and Equation 2.

As a result, the photoelasticity constant of glass has a large dispersion as a function of the wavelength of light in wavelength ranges of visible light that are used in a projection display device. Even with a glass in which the composition is adjusted so that the absolute photoelasticity constant in a specific wavelength range is small, the photoelasticity constant increases in other wavelength ranges. Accordingly, when a display device is used as a projection type display device, irregularities in the illumination intensity and color irregularities are not acceptable. More precisely, it was confirmed that it was impossible to obtain a photoelasticity constant with a small absolute value in all wavelength ranges of light by using one glass in a color projection type display device, in which the wavelengths that are used cover a large range. For example, in an optical system for a projection type display device that separates the three (RGB) colors, when a glass, whose composition has been adjusted so that the absolute value of the photoelasticity constant in the region R becomes acceptably small, is applied to all wavelength ranges, the photoelasticity constant in region G or B exceeds the acceptable range. The polarization is disturbed because of the various causes mentioned above, and irregularities occur in the illumination intensity of the projection type display device.

Figure 1:
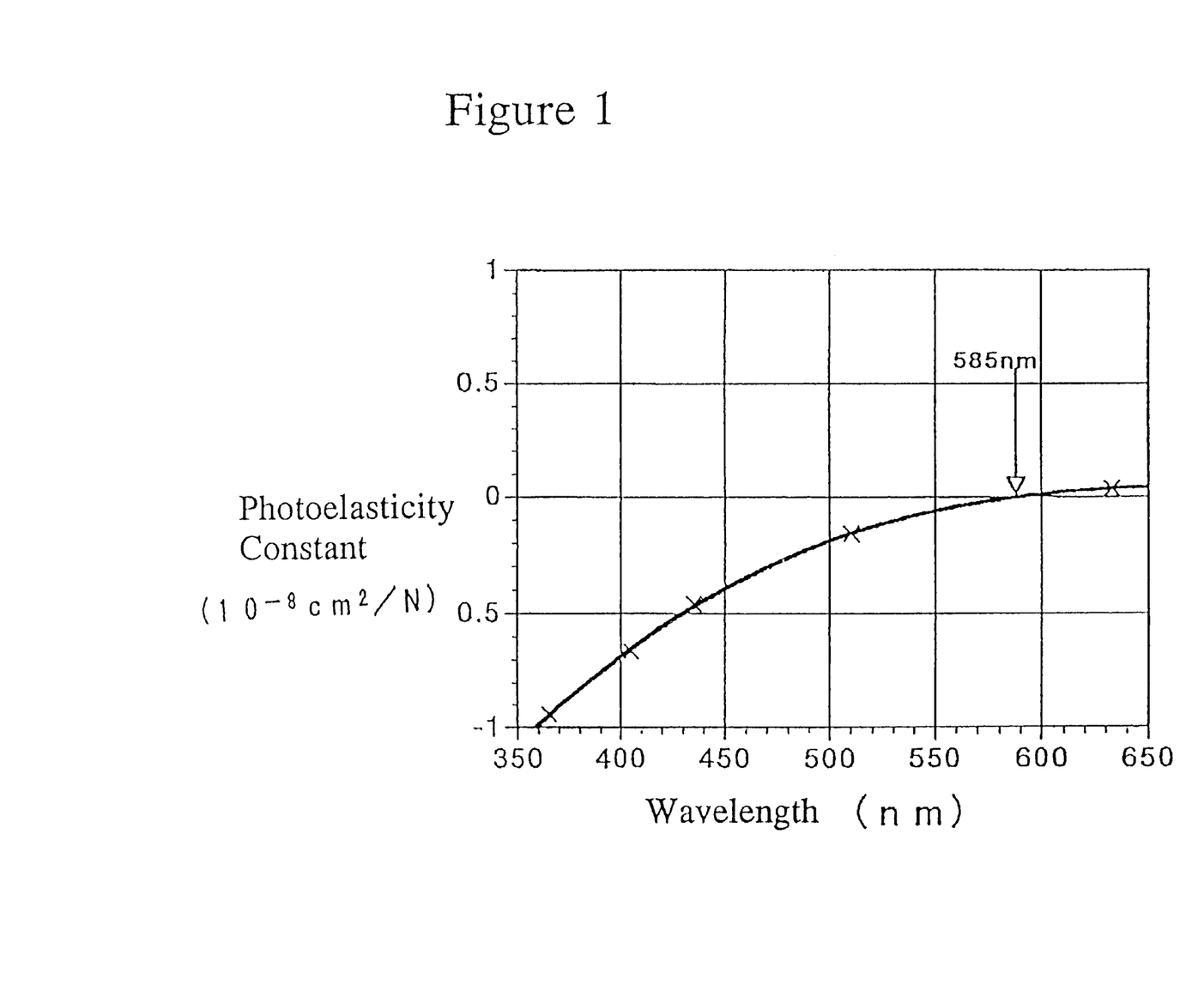
FIG. 1 is a graph representing the wavelength dependence of the photoelasticity constant of glass that can be used in polarizing beam splitters of a projection type display device according to the present invention.

Measured results of the wavelength dependence of the photoelasticity constant of the glass having composition No. 5 in Table I, which will be described later, are represented in FIG. 1. The photoelasticity constant of this glass is 0 around 585 nm, and this glass is most suitable as the base material for a polarizing beam splitter that is used in the wavelength range near this. The absolute value of the photoelasticity constant, however, increases at different wavelengths, and it is not considered suitable.

Therefore, the present inventors have created a particular structure for an optical system for a projection type display device that separates the three colors (RGB). In this structure, double refractions that are generated in all wavelength ranges of the three colors (RGB) by thermal and dynamic external stresses are minimized by manufacturing glass having a composition with an absolute value of the photoelasticity constant in each wavelength range (divided into RGB), and applying them to each of the wavelength ranges.

Samples for measuring the photoelasticity constant were for glass with compositions converted to oxide wt % within the ranges of:

SiO$_2$ 17.0–27.0%
Li$_2$O+Na$_2$O+K$_2$ 0 05–50%
PbO 73.0–75.0%
As$_2$O$_3$+Sb$_2$O$_3$ 0–30%

The photoelasticity constant was obtained from Equation 1 and Equation 2 by irradiating single-color light in the manner described above and measuring the index of refraction.

A portion of the measured results is displayed in Table I. Table I indicates the wavelengths and their compositions converted to oxide mol % when the absolute value of the photoelasticity constant is minimal.

TABLE I

| No. | 1 | 2 | 3 | 4 | 5 | 6 | 7 |
|---|---|---|---|---|---|---|---|
| SiO$_2$ | 25.9 | 25.4 | 24.9 | 24.4 | 23.9 | 23.4 | 22.9 |
| Na$_2$O | 0.9 | 0.9 | 0.9 | 0.9 | 0.9 | 0.9 | 0.9 |
| K$_2$O | 0.9 | 0.9 | 0.9 | 0.9 | 0.9 | 0.9 | 0.9 |
| PbO | 72.0 | 72.5 | 73.0 | 73.5 | 74.0 | 74.6 | 75.0 |
| Sb$_2$O$_2$ | 0.3 | 0.3 | 0.3 | 0.3 | 0.3 | 0.3 | 0.3 |
| ↑ | 397 | 412 | 482 | 522 | 585 | 674 | 789 |

↑ wavelength with the minimum absolute value of the photo-elasticity constant (nm)

The glass that was manufactured here was manufactured by preparing oxide, fluoride, hydroxide, carbonate, and nitrate, for example, that correspond to each of the components in Table I as materials, weighing and mixing them in specific proportions into mixed materials, and homogenizing them by heating to 900–1300° C. Fusing was performed in an electric furnace. Refining and agitating operations were performed. The materials were then cast into a preheated metallic mold and gradually cooled. Samples for the measurement of the photoelasticity constant were prepared by grinding and polishing the glass manufactured in this manner.

Figure 2:
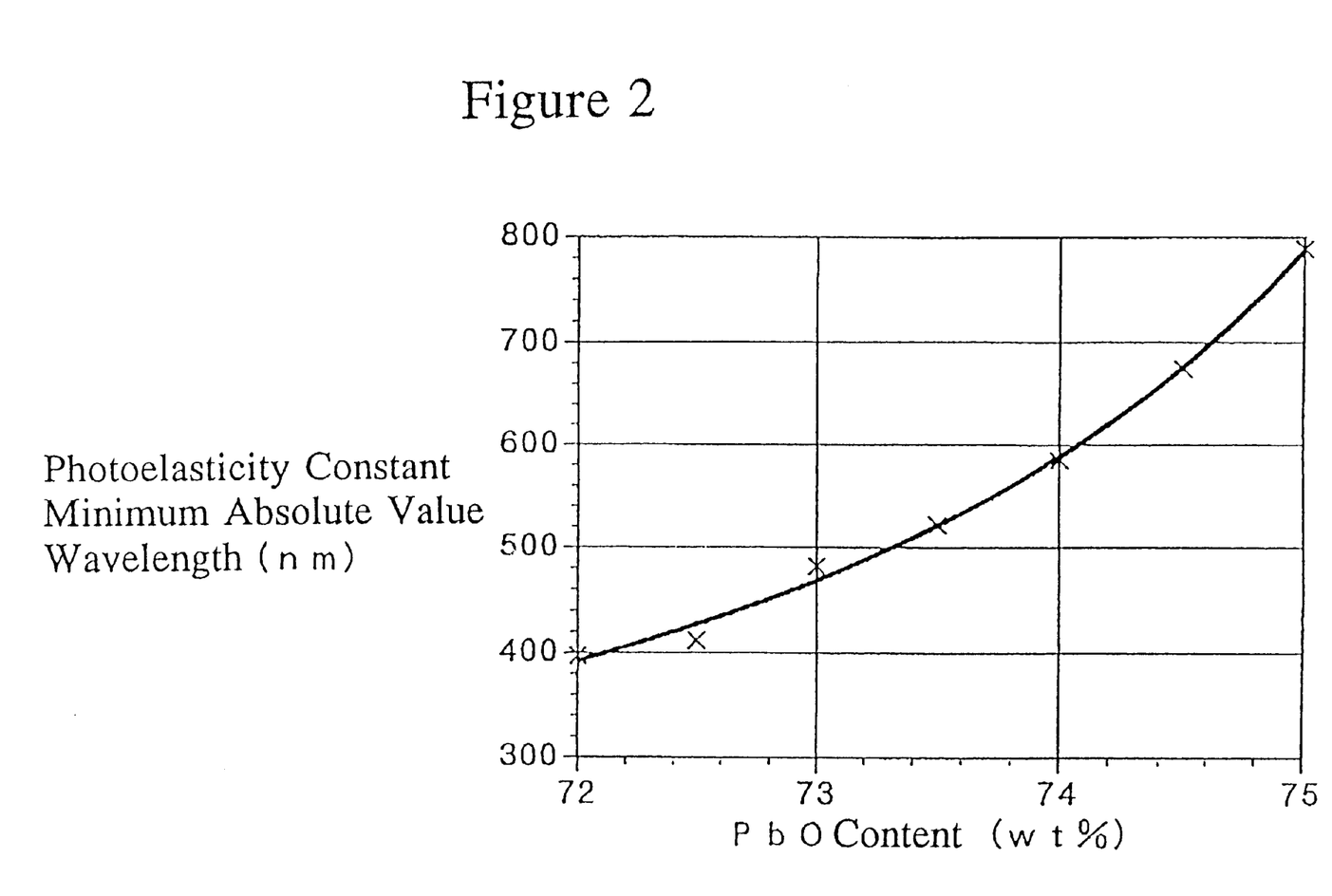
FIG. 2 is a graph representing the dependency of the photoelasticity constant on the PbO concentration.

From the measured results for wavelengths for which the absolute value of the photoelasticity constant is minimal, it was confirmed that there is a correlation, illustrated in FIG. 2, between the PbO content in the composition of glass and the wavelength of the minimum absolute value of the photoelasticity constant. The curve in the figure was obtained by fitting a third order polynomial.

Thus, it was recognized that the wavelength of light at which the minimal absolute value of the photoelasticity constant occurs can be controlled by controlling the PbO content in the composition of glass within the aforementioned compositions.

On the other hand, the auxiliary polarizing beam splitter (115) and the main polarizing beam splitter (114) in FIG. 4 were manufactured with glass, for which the absolute value of the photoelasticity constant is less than $0.01 \times 10^{-8}$ cm$^2$/N for the wavelength of light that passes through it. A projection type display device in FIG. 4 was manufactured, and the irregularity in the illumination intensity of the picture image that was displayed on the screen only by light B, which is the light B picture image, was evaluated. The irregularity in the illumination intensity of the light B picture image was similarly evaluated when manufacturing with a glass in which the absolute value of the photoelasticity constant was less than $1.33\times10^{-8}$ cm$^2$/N and when manufacturing with a glass in which the absolute value of the photoelasticity constant was less than $2.2\times10^{-8}$ cm$^2$/N. As a result, it was identified that the irregularities in the illumination intensity in the light B picture image can be accepted as a projection type display device when the photoelasticity constant is less than $1.33\times10^{-8}$ cm$^2$/N, but irregularities in the illumination intensity in the light B picture image are not acceptable when the photoelasticity constant is less than $2.2\times10^{-8}$ a cm$^2$/N. Therefore, in the present invention, a particular projection type display device is obtained. In the projection type display device, picture images with a small number of irregularities in illumination intensity can be obtained by constructing all of the auxiliary polarizing beam splitters (115), (215), and (315), as well as the main polarizing beams splitters (114), (214), and (314), with glass that has an absolute photoelasticity constant value for the transmitting light of less than $1.5\times10^{-8}$ cm$^2$/N or, in other words, glass with a photoelasticity constant of more than $-1.5\times10^{-8}$ cm$^2$/N but less than $1.5\times10^{-8}$ cm$^2$/N.

As shown in Table II, the base material for the prisms (1151), (1152), (1141), and (1142), which make up the auxiliary polarizing beam splitter (115) and the main polarizing beam splitter (114), was made of a glass with composition No. 3 in Table I. This was done in order to obtain an absolute value of the photoelasticity constant of $1.5\times10^{-8}$ cm$^2$/N for the wavelength of light B of more than 400 nm but less than 510 nm which passes through the auxiliary polarizing beam splitter (115) and the main polarizing beam splitter (114). The PbO composition of glass No. 3 is 73.0 wt %.

The base material for the prism which makes up the auxiliary polarizing beam splitter (215) and the main polarizing beam splitter (214) was a glass with composition No. 4 in Table I. This was done in order to obtain an absolute value of the photoelasticity constant of $1.5\times10^{-8}$ cm$^2$/ for the wavelength of light G of more than 510 nm but less than 590 nm, which passes through the auxiliary polarizing beam splitter (215) and the main polarizing beam splitter (214). The PbO composition of glass No. 4 is 73.5 wt %.

The base material for the prism which makes up the auxiliary polarizing beam splitter (315) and the main polarizing beam splitter (314) was a glass with composition No. 6 in Table I. This was done in order to obtain an absolute value of the photoelasticity constant of $1.5\times10^{-8}$ cm$^2$/N for the wavelength of light R of more than 590 nm but less than 680 nm which passes through the auxiliary polarizing beam splitter (315) and the main polarizing beam splitter (314). The PbO composition of glass No. 6 is 74.5 wt %.

TABLE II

| Wavelength region of light that is used | Region R | Region G | Region B |
|---|---|---|---|
| No. of glass ideal for application | 6 | 4 | 3 |
| Wavelength with the minimum absolute value of the photoelasticity constant (nm) | 482 | 522 | 674 |

In this way, three kinds of glass that have an absolute photoelasticity constant value of less than $1.5\times10^{-8}$ cm$^2$/N for the transmitting wavelength were selected, and the prisms explained in FIG. 3 that have a reflection surface at 45° to the optical axis were manufactured by grinding and polishing. They were further provided with an antireflection coating and a polarization and separation coatings and auxiliary polarizing beam splitters (115), (215), and (315), as well as main polarizing beam splitters (114), (214), and (314) were manufactured by laminating the prisms to each other. As described above, glass with a small photoelasticity constant absolute value was selected as the base material Consequently, the fear of double refractions occurring because of stress is small during grinding, polishing, film forming, and laminating processes, and the polarizing beam splitters can be easily manufactured using general processes.

The projection type display device in FIG. 4 was then manufactured by using these polarizing beam splitters. Accordingly, double refractions that occur within the base materials of the polarizing beam splitters due to stress during the manufacturing processes and heat can be kept to a minimum in all wavelength ranges. As a result, irregularities in illumination intensity and color irregularities in the picture image that-is displayed are small, and the performance of the entire projection type display device is improved.

In the aforementioned example, the auxiliary polarizing beam splitters (115), (215), and (315), as well as the main polarizing beam splitters (114), (214), and (314) for BGR were constructed with glass with the composition converted to oxide wt % of:

$SiO_2$ 17.0–27.0%

$Li_2O+Na_2O+K_2O$ 0.5–5.0%

PbO 73.0–75.0%

$As_2O_3+Sb_2O_3$ 0–3.0%

This glass will be designated as glass with composition A. Glass other than that having composition A but which has a composition with an absolute photoelasticity constant value of less than $1.5\times10^{-8}$ cm$^2$/N for the transmitting wavelength can be used.

Examples are, reduced to oxide mol %, $B_2O_3$ 0–57.0%

$Al_2O_3$ 0–13.0%

However, $B_2O_3+Al_2O_3$ 0.1–57.0%

$SiO_2$ 0–54.0%

However, $SiO_2+B_2O_3+Al_2O_3$ 43.0–57.0%

PbO 43.0–45.5%

$R_2O$ (R: Li, Na, K) 0–3.5%

R'O (R': Mg, Ca, Sr, Ba) 0–12.0%

$As_2O_3+Sb_2O_3$ 0–1.5%

Glass that includes fluorine ions can also be used. The number of fluorine ions should be within a range so that the percentage of all anions that are included in the glass is 0–0.1. In other words, glass with the aforementioned compositions can be used in which fluorine is introduced so that the $F_2$ molecules make up a percentage of 0–0.1 of the total of $F_2$ and $O_2$, when the fluorine ions and oxygen ions that are contained in the glass are converted into the $F_2$ molecules and $O_2$ molecules, in other words, so that $F_2/(F_2+O_2)$ becomes 0–0.1. Such a glass is denoted as glass with the composition B.

The minimum absolute value of the photoelasticity constant of this glass with composition B is also less than $1.5\times10^{-8}$ cm$^2$/N. Therefore, a projection type display device, which is equipped with polarizing beam splitters that are made of base materials with an absolute photoelasticity constant value of less than $1.5–10^{-8}$ cm$^2$/N for all BGR beams, can be provided by selecting glass with different compositions according to the wavelength range that is used.

It is certainly possible to construct some of the polarizing beam splitters for BGR beams with glass of composition A, and construct the rest of the polarizing beam splitters with glass of composition B.

The polarizing beam splitters for BGR beams were constructed from three kinds of glass with compositions that were different from each other in the present implementation form; however, it is possible to construct the polarizing beam splitters for B light and the polarizing beam splitters for G light with a glass of the same composition, for example. In this case, it is possible to have a structure in which the absolute value of the photoelasticity constant is less than $1.5 \times 10^{-8}$ $cm^2/N$ for wavelengths of B light and G light by adjusting the glass composition and the wavelength range of the BGR beams separated by the cross dichroic prism (11). It is similarly possible to construct the polarizing beam splitters for G light and the polarizing beam splitters for R light by a glass of the same composition.

The present invention has a structure in which the auxiliary polarizing beam splitters (115), (215), and (315), as well as the main polarizing beam splitters (114), (214), and (314), are arranged so that the reflection surfaces of two polarizing beam splitters are directed into a rotated 45° direction as illustrated in FIG. 3. Thus, only light with polarization parallel to the x axis can be efficiently extracted from the beam that is emitted from the light source. This light can be polarized and enter the spatial modulating element. The reflected light from the spatial modulating element can also be efficiently separated from the incident light.

Only the polarizing beam splitters for the BGR beams were constructed of glass with an absolute value of the photoelasticity constant value of less than $1.5 \times 10^{-8}$ $cm^2/N$ in the present example. However, a projection type display device in which picture images of better quality can be displayed, and in which irregularities in the illumination intensity and color irregularities are reduced, can be provided by constructing the substrates which allow light to pass, in the components that make up the spatial modulating element (113), (213), and (313), and the base material for the dichroic prism (17), for example, with the aforementioned glass with compositions with a small absolute value of the photoelasticity constant for the wavelength of transmitted light.

The auxiliary polarizing beam splitters (115), (215), and (315), as well as the main polarizing beam splitters (114), (214), and (314), were constructed with glass in the present example. Therefore, these auxiliary beam splitters were formed in the manner of the polarizing beam splitters that had reflection surfaces of 45° to the optical axis. However, when the existing liquid soaking type polarizing beam splitters are used, the installation angle of 45° to the optical axis cannot be attained in the relationship with the index of refraction, and the projection type display device becomes large and heavy. On the other hand, the optical system of the present invention can be constructed from polarizing beam splitters that have reflection surfaces of 45°, and a compact device can be attained.

Furthermore, the projection type display device in the present example does not use liquids in polarizing beam splitters. As a result, it is resistant to changes in temperature, and handling is easy. Moreover, a low manufacturing cost can be achieved because it can be manufactured by common grinding and polishing processes.

The present invention offers a color projection type display device which separates three colors (RGB), modulates each of the components, then again superimposes and projects them. Such a device can display color picture images with a small amount of irregularity in illumination intensity.

I claim:

1. A projection type display device comprising:

a light source unit which emits primary, secondary, and tertiary beams having different wavelengths in different respective directions;

primary, secondary, and tertiary spatial light modulating elements which respectively modulate intensities of the primary, secondary, and tertiary beams in order to provide each of the primary, secondary, and tertiary beams with picture image information;

primary, secondary, and tertiary polarization and separation units respectively arranged between the light source unit and the primary, secondary, and tertiary spatial light modulating elements in order to separate an optical path of a beam reflected by the spatial light modulating elements from an optical path of the incident beam; and a projection optical system, which superimposes the reflected beams separated by the primary, secondary, and tertiary separation units and projects them;

the primary, secondary, and tertiary polarization and separation units respectively being equipped with an optical component through which at least one of the incident beam and the beam reflected to the primary, secondary, and tertiary spatial light modulating elements passes;

a base material which makes up the optical component of the primary polarization and separation unit, a base material which makes up the optical component of the secondary polarization and separation unit, and a base material which makes up the optical component of the tertiary polarization and separation unit having different wavelengths at which an absolute value of the photoelasticity constant becomes minimal.

2. A projection type display device comprising:

a light source unit which emits primary, secondary, and tertiary beams having a different wavelengths in different respective directions;

primary, secondary, and tertiary spatial light modulating elements, which respectively modulate intensities of the primary, secondary, and tertiary beams in order to provide each of the primary, secondary, and tertiary beams with picture image information;

primary, secondary, and tertiary polarization and separation units respectively arranged between the light source unit and the primary, secondary, and tertiary spatial light modulating elements in order to separate an optical path of a beam reflected by the spatial light modulating elements from an optical path of the incident beam; and a projection optical system, which superimposes the reflected beams separated by the primary, secondary, and tertiary separation units and projects them;

the primary, secondary, and tertiary polarization and separation units respectively being equipped with an optical component through which at least one of the incident beam and the beam reflected to the primary, secondary, and tertiary spatial light modulating elements passes;

base materials which respectively make up the optical component of at least two polarization and separation units of the primary, secondary, and tertiary polarization and separation units having different wavelengths at which an absolute value of the photoelasticity constant becomes minimal.

3. The projection type display device defined in claim 1 wherein the base materials which respectively compose the optical components of the primary, secondary, and tertiary polarization and separation units all have an absolute value of the photoelasticity constant for wavelengths of the aforementioned primary, secondary, and tertiary beams that pass through the optical component of less than $1.5 \times 10^{-8}$ cm$^2$/N.

4. The projection type display device defined in claim 2 wherein the base materials which respectively compose the optical components of the primary, secondary, and tertiary polarization and separation units all have an absolute value of the photoelasticity constant for wavelengths of the aforementioned primary, secondary, and tertiary beams that pass through the optical component of less than $1.5 \times 10^{-8}$ cm$^2$/N.

5. A projection type display device comprising:

a light source unit which emits primary, secondary, and tertiary beams having different wavelengths in different respective directions;

primary, secondary, and tertiary spatial light modulating elements, which respectively modulate intensities of the primary, secondary, and tertiary beams in order to provide each of the primary, secondary, and tertiary beams with picture image information;

primary, secondary, and tertiary polarization and separation units respectively arranged between the light source unit and the primary, secondary, and tertiary spatial light modulating elements in order to separate an optical path of a beam reflected by the spatial light modulating elements from an optical path of the incident beam; and a projection optical system, which superimposes the reflected beams separated by the primary, secondary, and tertiary separation units and projects them;

the primary, secondary, and tertiary polarization and separation units respectively being equipped with an optical component through which at least one of the incident beam and the beam reflected to the primary, secondary, and tertiary spatial light modulating elements passes;

a base material which makes up the optical component of the primary polarization and separation unit, the base material which makes up the optical component of the secondary polarization and separation unit, and the base material which makes up the optical component of the tertiary polarization and separation unit all having an absolute value of the photoelasticity constant for the wavelengths of the primary, secondary, and tertiary beams that pass through the optical component of less than $1.5 \times 10^{-8}$ cm$^2$/N.

6. The projection type display device defined in claim 1, wherein the primary secondary and tertiary polarization and separation units are polarizing beam splitters.

7. The projection type display device defined in claim 1, wherein a wavelength of the primary beam is more than 400 nm but less than 510 nm, a wavelength of the secondary beam is more than 510 nm but less than 590 nm, and a wavelength of the tertiary beam is more than 590 nm but less than 680 nm.

8. The projection type display device defined in claim 1, wherein wavelengths of the primary and secondary beams are more than 400 nm but less than 590 nm and a wavelength of the tertiary beam is more than 590 nm but less than 680 nm.

9. The projection type display device defined in claim 1, wherein a wavelength of the primary beam is more than 400 nm but less than 510 nm and the wavelengths of the secondary and tertiary beams are more than 510 nm but less than 680 nm.

10. The projection type display device defined in claim 1, wherein a composition of the base material which makes up the optical component of at least one polarization and separation unit of the primary, secondary, and tertiary polarization and separation units, converted to oxide includes components within the following ranges:

$B_2O_3$ 0–57.0%;

$Al_2O_3$ 0–13.0%;

$B_2O_3+Al_3O_3$ 0.1–57.0%;

$SiO_2$ 0–54.0%;

$SiO_2+B_2O_3+Al_2O_3$ 43.0–57.0%;

PbO 43.0–45.5%;

$R_2O$ (R: Li, Ha, K) 0–3.5%;

R'O (R': Mg, Ca, Sr, Ba) 0–12.0%; and $As_2O_3+Sb_2O_3$ 0 . 1.5%;

said composition is glass that contains fluorine ions; and the fluorine ions comprise 0–10% of all anions that are included in the glass.

11. The projection type display device defined in claim 1, wherein the base material which makes up the optical component of at least one polarization and separation unit of the aforementioned primary, secondary, and tertiary polarization and separation units is glass with the composition converted to oxide including components within the following ranges:

$SiO_2$ 17.0–27.0%;

$Li_2O+Na_2O+K_2O$ 0.5–5.0%;

PbO 73.0–75.0%; and $As_2O_3+Sb_2O_3$ 0–3.0%.

12. The projection type display device defined in claim 11, wherein the base material which makes up the optical component of the primary polarization and separation unit is glass with the composition converted to oxide including components within the following ranges:

$SiO_2$ 24.9%;

$Na_2O$ 0.9%;

$K_2O$ 0.9%;

PbO 73.0%; and $Sb_2O_3$ 0.33%.

13. The projection type display device defined in claim 11, wherein the base material which makes up the optical component of the secondary polarization and separation unit is glass with the composition converted to oxide including components within the following ranges:

$SiO_2$ 24.9%;

$Na_2O$ 0.9%;

$K_2O$ 0.9%;

PbO 73.5%; and $Sb_2O_3$ 0.3%.

14. The projection type display device defined in claim 11, wherein the base material which makes up the optical component of the tertiary polarization and separation unit being glass with the composition converted to oxide including components within the following ranges:

$SiO_2$ 23.9%;

$Na_2O$ 0.9%;

$K_2O$ 0.9%;

PbO 74.5%; and $Sb_2O_3$ 0.3%.

15. The projection type display device defined in claim 1, wherein all base materials which make up the optical components of the primary, secondary, and tertiary polarization and separation units are glass with their compositions converted to oxide including components within the following ranges:

$SiO_2$ 17.0–27.0%;

$Li_2O+Na_2O+K_2O$ 0.5–5.0%;

PbO 73.0–75.0%; and $As_2O_3+Sb_2O_3$ 0–3.0%;

the values of the PbO components being different among the base material for the optical component of the primary polarization and separation unit, the base material for the aforementioned optical component of the secondary polarization and separation unit, and the base material for the aforementioned optical component of the tertiary polarization and separation unit.

16. The projection type display device defined in claim 2, wherein the primary, secondary, and tertiary polarization and separation units are polarizing beam splitters.

17. The projection type display device defined in claim 5, wherein the primary, secondary, and tertiary polarization and separation units are polarizing beam splitters.

18. The projection type display device defined in claim 2, wherein a wavelength of the primary beam is more than 400 nm but than 510 nm, a wavelength of the secondary beam is more than 510 nm but less than 590 nm, and a wavelength of the tertiary beam is more than 590 nm but less than 680 nm.

19. The projection type display device defined in claim 5, wherein a wavelength of the primary beam is more than 400 nm but less than 510 nm, a wavelength of the secondary beam is more than 510 nm but less than 590 nm, and a wavelength of the tertiary beam is more than 590 nm but less than 680 nm.

20. The projection type display device defined in claim 2, wherein wavelengths of the primary and secondary beams are more than 400 nm but less than 590 nm and a wavelength of the tertiary beam is more than 590 nm but less than 680 nm.

* * * * *